(12) United States Patent
Miller et al.

(10) Patent No.: US 10,759,255 B2
(45) Date of Patent: Sep. 1, 2020

(54) AUTONOMOUS-VEHICLE CLIMATE-CONTROL SYSTEM

(71) Applicant: Ford Global Technologies, LLC, Dearborn, MI (US)

(72) Inventors: Kenneth James Miller, Canton, MI (US); Thomas G. Leone, Ypsilanti, MI (US); Christopher Alan Lear, Dearborn, MI (US); Chris James Hocking, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 654 days.

(21) Appl. No.: 15/214,496

(22) Filed: Jul. 20, 2016

(65) Prior Publication Data
US 2018/0022182 A1 Jan. 25, 2018

(51) Int. Cl.
*B60H 1/00* (2006.01)

(52) U.S. Cl.
CPC ..... *B60H 1/00742* (2013.01); *B60H 1/00064* (2013.01); *B60H 1/00357* (2013.01); *B60H 1/00778* (2013.01); *B60H 1/00878* (2013.01)

(58) Field of Classification Search
CPC ............ B60H 1/00742; B60H 1/00021; B60H 1/00842; B60H 1/00385
USPC .......................................... 165/202, 42, 203
See application file for complete search history.

(56) References Cited

U.S. PATENT DOCUMENTS

| | | | |
|---|---|---|---|
| 6,436,005 B1 | 8/2002 | Bellinger | |
| 6,786,191 B2 | 9/2004 | Foster | |
| 6,874,383 B2 | 4/2005 | Sayman et al. | |
| 7,278,391 B1 | 10/2007 | Wong et al. | |
| 7,499,784 B2 | 3/2009 | Kresse | |
| 7,637,842 B2 | 12/2009 | Tamai et al. | |
| 7,696,710 B2 * | 4/2010 | Byrne | B60S 1/0822 318/444 |
| 7,836,866 B2 | 11/2010 | Luken et al. | |
| 8,050,856 B2 | 11/2011 | Duty et al. | |
| 8,108,132 B2 | 1/2012 | Reinke | |

(Continued)

FOREIGN PATENT DOCUMENTS

| | | |
|---|---|---|
| CN | 102337974 A | 2/2012 |
| CN | 205370771 U | 7/2016 |

OTHER PUBLICATIONS

Non-Final Office Action dated Jun. 19, 2017 for U.S. Appl. No. 15/155,552 (4 pages).

(Continued)

*Primary Examiner* — Tho V Duong
*Assistant Examiner* — Rahenna R Malik
(74) *Attorney, Agent, or Firm* — David B. Kelley; Bejin Bieneman PLC

(57) ABSTRACT

Controlling a vehicle includes determining that an occupancy status of the vehicle is unoccupied, estimating a remaining unoccupied time, and controlling a climate-control system according to climate-control parameters based on at least the occupancy status and the remaining unoccupied time. A climate-control parameter is a value or set of values for an attribute or attributes of vehicle climate control, such as a power status for the climate-control system as a whole, a target temperature for a passenger cabin, power statuses corresponding to individual climate zones of the passenger cabin, and target temperatures for the individual climate zones.

20 Claims, 3 Drawing Sheets

(56) References Cited

U.S. PATENT DOCUMENTS

| | | | |
|---|---|---|---|
| 8,660,734 B2 | 2/2014 | Zhu et al. | |
| 8,755,959 B2 | 6/2014 | Fassnacht | |
| 8,768,539 B1* | 7/2014 | Clement | B60W 10/20 |
| | | | 701/2 |
| 8,882,636 B2 | 11/2014 | Pietron et al. | |
| 8,948,955 B2 | 2/2015 | Zhu et al. | |
| 9,008,854 B2 | 4/2015 | Breed | |
| 9,082,239 B2 | 7/2015 | Ricci | |
| 9,086,020 B2 | 7/2015 | Pirjaberi et al. | |
| 9,475,361 B2* | 10/2016 | Arai | B60H 1/00771 |
| 9,638,480 B1* | 5/2017 | Maranville | F25B 5/02 |
| 9,682,609 B1* | 6/2017 | Dudar | B60H 1/00764 |
| 2004/0068998 A1* | 4/2004 | Ieda | B60H 1/00835 |
| | | | 62/186 |
| 2004/0079099 A1* | 4/2004 | Kumada | B60H 1/00742 |
| | | | 62/244 |
| 2004/0129007 A1* | 7/2004 | Tomita | B60H 1/00064 |
| | | | 62/157 |
| 2005/0045322 A1* | 3/2005 | Yoshida | B60H 1/00785 |
| | | | 165/202 |
| 2005/0052080 A1 | 3/2005 | Maslov et al. | |
| 2005/0121185 A1* | 6/2005 | Yonekura | B60H 1/00785 |
| | | | 165/202 |
| 2006/0000597 A1* | 1/2006 | Errington | B60H 1/00785 |
| | | | 165/204 |
| 2007/0038364 A1* | 2/2007 | Lee | G01C 21/20 |
| | | | 701/532 |
| 2007/0112502 A1 | 5/2007 | Asano et al. | |
| 2007/0209789 A1* | 9/2007 | Oomura | B60H 1/3207 |
| | | | 165/202 |
| 2007/0235549 A1* | 10/2007 | Nakajima | B60H 1/00785 |
| | | | 236/44 R |
| 2007/0277544 A1* | 12/2007 | Honda | B60H 1/321 |
| | | | 62/228.3 |
| 2008/0196954 A1 | 8/2008 | Soliman et al. | |
| 2009/0030568 A1* | 1/2009 | Amano | B60K 6/445 |
| | | | 701/22 |
| 2009/0031741 A1* | 2/2009 | Hara | B60H 1/00735 |
| | | | 62/239 |
| 2009/0139789 A1 | 6/2009 | Yang | |
| 2010/0132388 A1* | 6/2010 | Oyobe | B60H 1/004 |
| | | | 62/157 |
| 2010/0163220 A1* | 7/2010 | Nakajima | B60H 1/00785 |
| | | | 165/202 |
| 2011/0112708 A1 | 5/2011 | Fassnacht | |
| 2011/0172880 A1* | 7/2011 | Tamura | B60H 1/00735 |
| | | | 701/36 |
| 2011/0208403 A1 | 8/2011 | Tsumiyama et al. | |
| 2011/0246021 A1 | 10/2011 | Prokhorov | |
| 2012/0074238 A1* | 3/2012 | Morita | F02D 13/0249 |
| | | | 237/5 |
| 2012/0109438 A1 | 5/2012 | Akebono et al. | |
| 2013/0079978 A1* | 3/2013 | Uyeki | B60H 1/00657 |
| | | | 701/36 |
| 2013/0092127 A1 | 4/2013 | Pirjaberi | |
| 2014/0034266 A1* | 2/2014 | Tabei | B60H 1/00764 |
| | | | 165/42 |
| 2014/0053804 A1 | 2/2014 | Rayl et al. | |
| 2014/0090624 A1 | 4/2014 | Verner | |
| 2014/0244106 A1 | 8/2014 | Singer et al. | |
| 2015/0129192 A1* | 5/2015 | Boss | B60H 1/00771 |
| | | | 165/202 |
| 2015/0203106 A1 | 7/2015 | Zhao et al. | |
| 2015/0260117 A1 | 9/2015 | Shost et al. | |
| 2015/0338858 A1* | 11/2015 | Bates | B60P 3/20 |
| | | | 62/56 |
| 2015/0345958 A1* | 12/2015 | Graham | G01C 21/343 |
| | | | 701/22 |
| 2016/0059845 A1 | 3/2016 | Nefcy et al. | |
| 2016/0144689 A1* | 5/2016 | Miller | B60H 1/00771 |
| | | | 165/202 |
| 2016/0193895 A1* | 7/2016 | Aich | B60H 1/00657 |
| | | | 165/202 |
| 2016/0207375 A1* | 7/2016 | Gauthier | B60H 1/00778 |
| 2016/0214596 A1 | 7/2016 | Glugla et al. | |
| 2016/0280160 A1* | 9/2016 | MacNeille | G05B 15/02 |
| 2016/0328976 A1 | 11/2016 | Jo et al. | |
| 2016/0339906 A1 | 11/2016 | Nefcy et al. | |
| 2016/0347149 A1* | 12/2016 | Rustoni | B60H 1/00771 |

OTHER PUBLICATIONS

Wilcutts et al., "Design and Benefits of Dynamic Skip Fire Strategies for Cylinder Deactivated Engines", SAE Int. J. Engines 6(1):2013, doi:10.4271/2013-01-0359; published Apr. 8, 2013, 11 pages.

UKIPO Search Report dated Aug. 24, 2017 for Application No. GB1707219.0 (5 pages).

Non-Final Office Action dated Jun. 4, 2018 for U.S. Appl. No. 15/155,502 (26 pages).

Non-Final Office Action dated Jun. 14, 2018 for U.S. Appl. No. 15/181,491 (32 pages).

* cited by examiner

AUTONOMOUS-VEHICLE CLIMATE-CONTROL SYSTEM

BACKGROUND

A climate-control system provides heating and/or cooling to a passenger cabin of a vehicle. The climate-control system may operate to cool the passenger cabin by transporting a refrigerant through a heat cycle to absorb heat from the passenger cabin and expel the heat from the vehicle, combined with fans, blowers, and ducts to move air between the passenger cabin and the climate-control system. The climate-control system may operate as a radiator for an engine of the vehicle to heat the passenger cabin by transferring some waste heat from the engine into the passenger cabin.

Cooling and heating the passenger cabin can decrease the fuel economy of the vehicle. To cool the passenger cabin, the climate-control system takes power from the engine to move the refrigerant through the heat cycle via a compressor, condenser, fans, and so on. To heat the passenger cabin, the climate-control system may not have access to sufficient waste heat from the engine if, for example, the vehicle is an electric or hybrid-electric vehicle or if the engine has not had enough time to warm up. In those cases, the climate-control system needs additional power to heat the passenger cabin, for example, by using an electric heater, affecting fuel economy.

DETAILED DESCRIPTION

Figure 1:
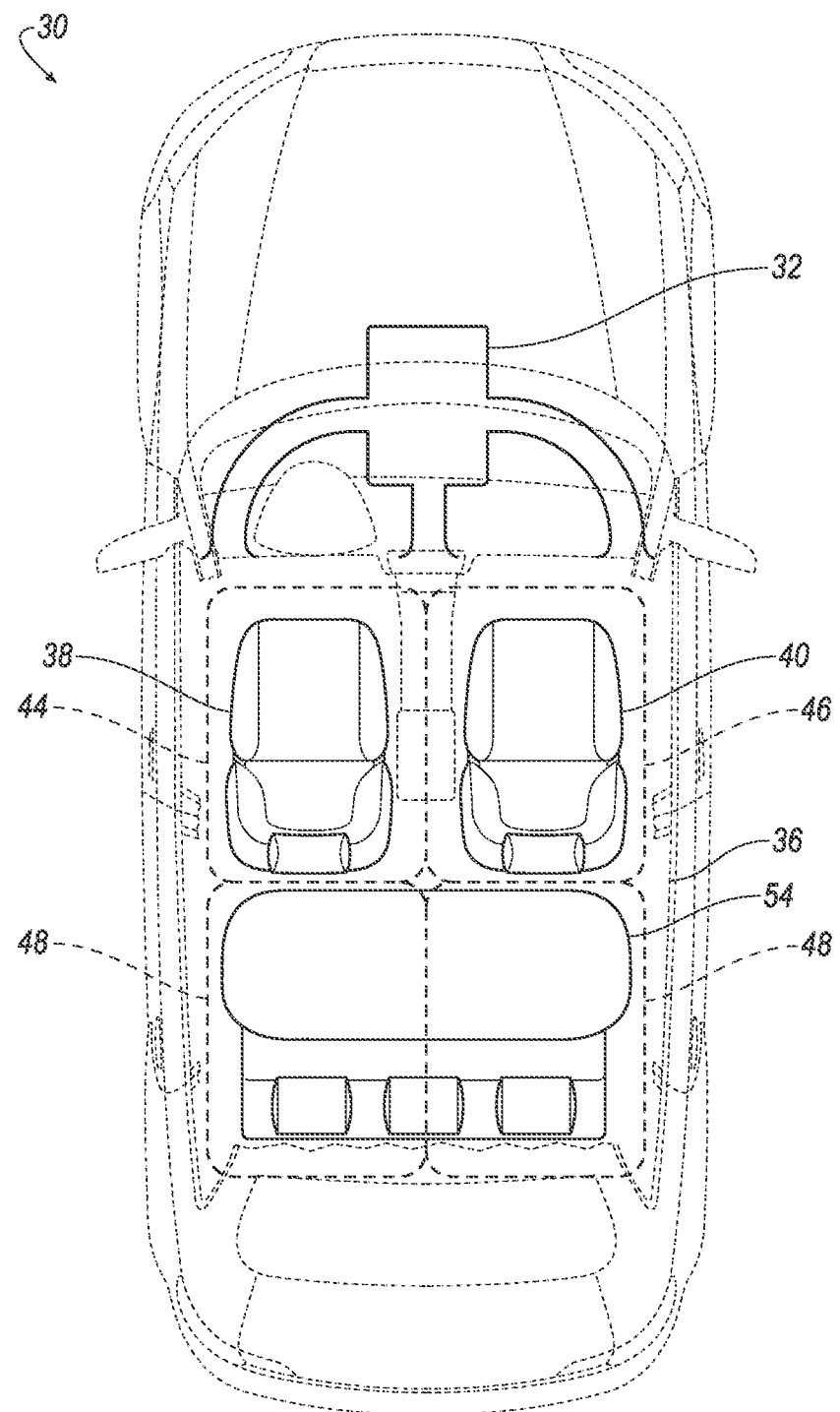
FIG. 1 is a top view of an example vehicle.

As disclosed herein, controlling a vehicle 30 includes determining that an occupancy status of the vehicle 30 is unoccupied, estimating a remaining unoccupied time, and controlling a climate-control system 32 according to climate-control parameters based on at least the occupancy status and the remaining unoccupied time.

Using the occupancy status and the remaining unoccupied time to set the climate-control parameters increases the efficiency of the vehicle 30 at the expense of decreasing the comfort of a passenger cabin 36 in situations in which the decreased comfort is less likely to be experienced by occupants. In some situations, e.g., if the vehicle 30 is autonomous (according to the definition of that term below), then the vehicle 30 may be unoccupied, or the occupants may be seated only in a back seat 42 and not the driver and passenger seats 38, 40, or an occupant may be seated in the passenger seat 40 and not the driver seat 38. Lessened or no climate control has less downside in some of these occupancy statuses than others, so it becomes more acceptable to trade off comfort in the passenger cabin 36 for greater efficiency of the vehicle 30.

The vehicle 30 may be an autonomous vehicle. In this context, "autonomous" means that each of vehicle propulsion, steering, and braking are controlled by a controller 34 without human intervention. The controller 34, sometimes referred to as the "virtual driver," may be capable of operating the vehicle 30 partially or completely independently of the intervention of a human driver, e.g., the vehicle 30 could be operated semi-autonomously, meaning that one or two of propulsion, steering, and braking are controlled by the controller 34 without human intervention. The controller 34 may be programmed to operate an engine, a braking system, a steering system, and/or other vehicle systems. The controller 34 may have an autonomous mode, in which the controller 34 operates the vehicle 30, i.e., operates the subsystems of the vehicle 30 pertaining to propulsion, steering, and braking; and semi-autonomous and/or manual modes, in which a human driver operates some or all of these subsystems.

As shown in FIG. 1, the vehicle 30 includes the passenger cabin 36 to house occupants, if any, of the vehicle 30. The passenger cabin 36 includes the driver seat 38 and the passenger seat 40 disposed at a front of the passenger cabin 36, and one or more back seats 42 disposed behind the driver and passenger seats 38, 40. The passenger cabin 36 may also include third-row seats (not shown) at a rear of the passenger cabin 36. In FIG. 1, the driver and passenger seats 38, 40 are shown to be bucket seats and the back seat 42 is a bench seat, but the seats 38, 40, 42 may be other types. The seats 38, 40, 42 may be coupled to the climate-control system 32, that is, directly or indirectly mechanically connected to the climate-control system 32; specifically, the seats 38, 40, 42 may be coupled to a frame of the vehicle 30 (not shown), and the climate-control system 32 may be coupled to the frame. The position and orientation of the seats 38, 40, 42 and components thereof may be adjustable by an occupant, e.g., in a known manner.

The climate-control system 32 provides heating and/or cooling to the passenger cabin 36 of the vehicle 30. The climate-control system 32 may include a compressor, a condenser, a receiver-dryer, a thermal-expansion valve, an evaporator, blowers, fans, ducts, vents, vanes, temperature sensors, and other components that are known for heating or cooling vehicle interiors. The climate-control system 32 may operate to cool the passenger cabin 36 by transporting a refrigerant through a heat cycle to absorb heat from the passenger cabin 36 and expel the heat from the vehicle 30, as is known. The climate-control system 32 may include a heater core that operates as a radiator for an engine of the vehicle 30 by transferring some waste heat from the engine into the passenger cabin 36, as is known. The climate-control system 32 may include an electrically powered heater such as a resistive heater, positive-temperature-coefficient heater, electrically power heat pump, etc.

The climate-control system 32 controls a quantity of heat flowing to or from different regions of the passenger cabin 36, called climate zones 44, 46, 48. The number and arrangement of climate zones 44, 46, 48 in the passenger cabin 36 may vary. For example, the passenger cabin 36 may include a driver zone 44 around the driver seat 38, a passenger zone 46 around the passenger seat 40, and two rear zones 48 across the back seat 42. Alternatively, the passenger cabin 36 may have more or fewer climate zones 44, 46, 48.

The controller 34 sets climate-control parameters that affect the operation of the climate-control system 32. A climate-control parameter is a value or set of values for an attribute or attributes of vehicle climate control. Possible climate-control parameters include a power status for the climate-control system 32 as a whole, a target temperature for the passenger cabin 36, a power level for the passenger cabin 36, fan speed or air-circulation rate for the passenger cabin 36, power statuses corresponding to individual climate zones 44, 46, 48, target temperatures for individual climate zones 44, 46, 48, power levels for individual climate zones 44, 46, 48, and fan speeds or air-circulation rates for individual climate zones 44, 46, 48. Fan speeds or air-circulation rates may be treated as a contributor to the target temperature or the power level or be treated as a climate-control parameter. The power status may be on or off, depending on whether the climate-control system 32 is operating to heat or cool the passenger cabin 36 or a climate zone 44, 46, 48.

Figure 2:
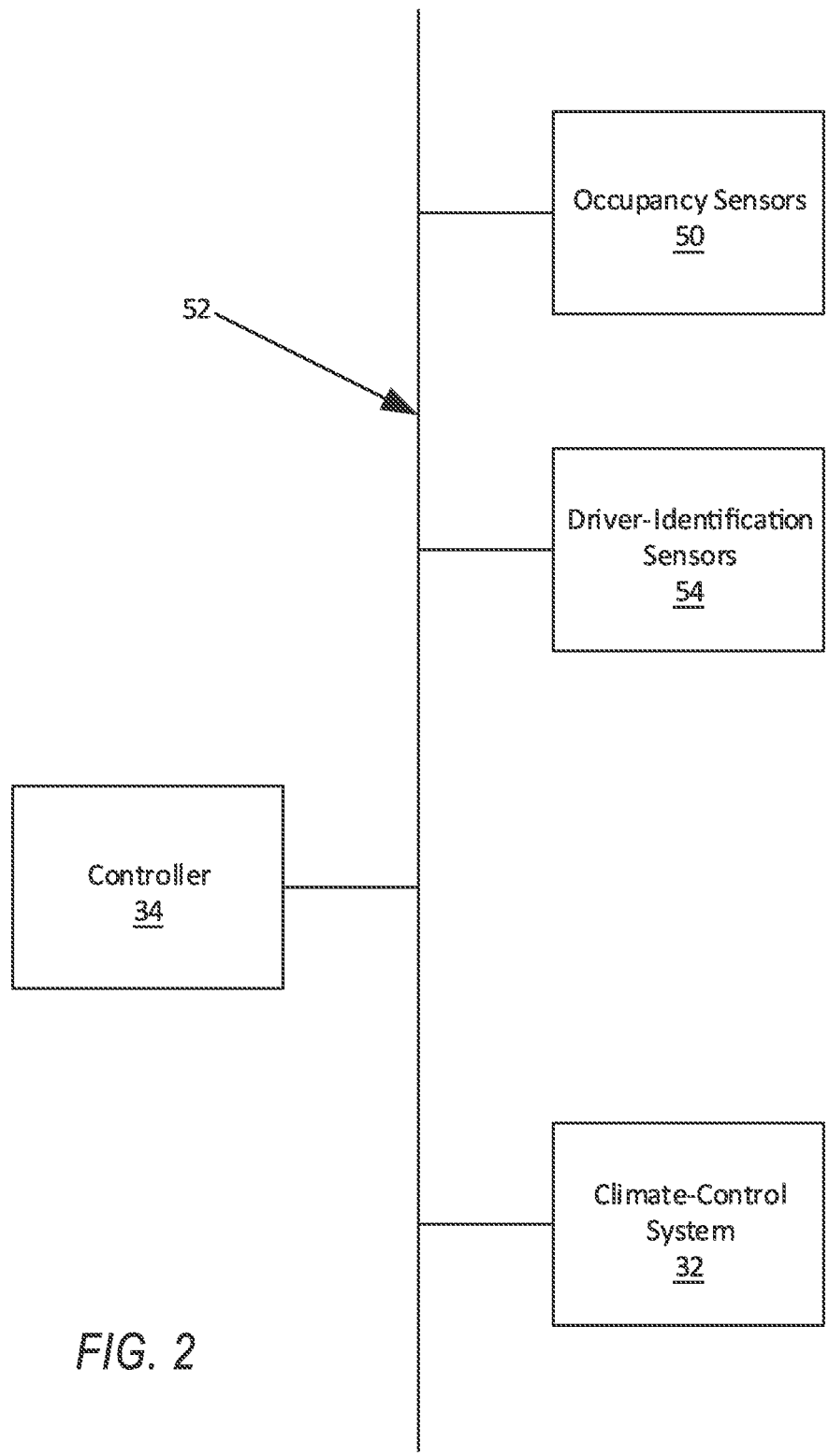
FIG. 2 is a block diagram of an example control system.

As shown in FIG. 2, the vehicle 30 includes occupancy sensors 50 configured, e.g., in a known manner, to detect occupancy (or lack thereof) of the driver seat 38, the passenger seat 40, and the back seat 42. The occupancy sensors 50 may be visible-light or infrared cameras directed at the seats 38, 40, 42, weight sensors inside the seats 38, 40, 42, sensors detecting whether a seat belt (not shown) is buckled or unspooled, a receiver receiving a signal from device carried with an occupant such as a mobile phone, or other suitable sensors. The occupancy sensors 50 are in communication with the controller 34 via a communications network 52. If the vehicle 30 is in manual mode, the controller 34 detects that the driver seat 38 is necessarily occupied.

A driver-identification sensor 54 may be in communication with the controller 34. The driver-identification sensor 54 may detect an RFID or other signature unique to different keys of the vehicle 30, an input by an occupant of the vehicle 30, biometric data of an occupant of the vehicle 30, or any other suitable indicator of identity for an occupant of the vehicle 30. The identity of an occupant of the vehicle 30 may be associated with a classification of that occupant, for example, as a chauffeur or as a nonchauffeur.

As further shown in FIG. 2, the controller 34 is communicatively coupled to the climate-control system 32. The controller 34 may be a microprocessor-based controller. The controller 34 may include a processor, memory, etc. The memory of the controller 34 typically stores instructions executable by the processor.

The controller 34 may transmit and receive signals through the communications network 52, such as a controller area network (CAN) bus, Ethernet, Local Interconnect Network (LIN), and/or by any other wired or wireless communications network, e.g., as is known.

Figure 3:
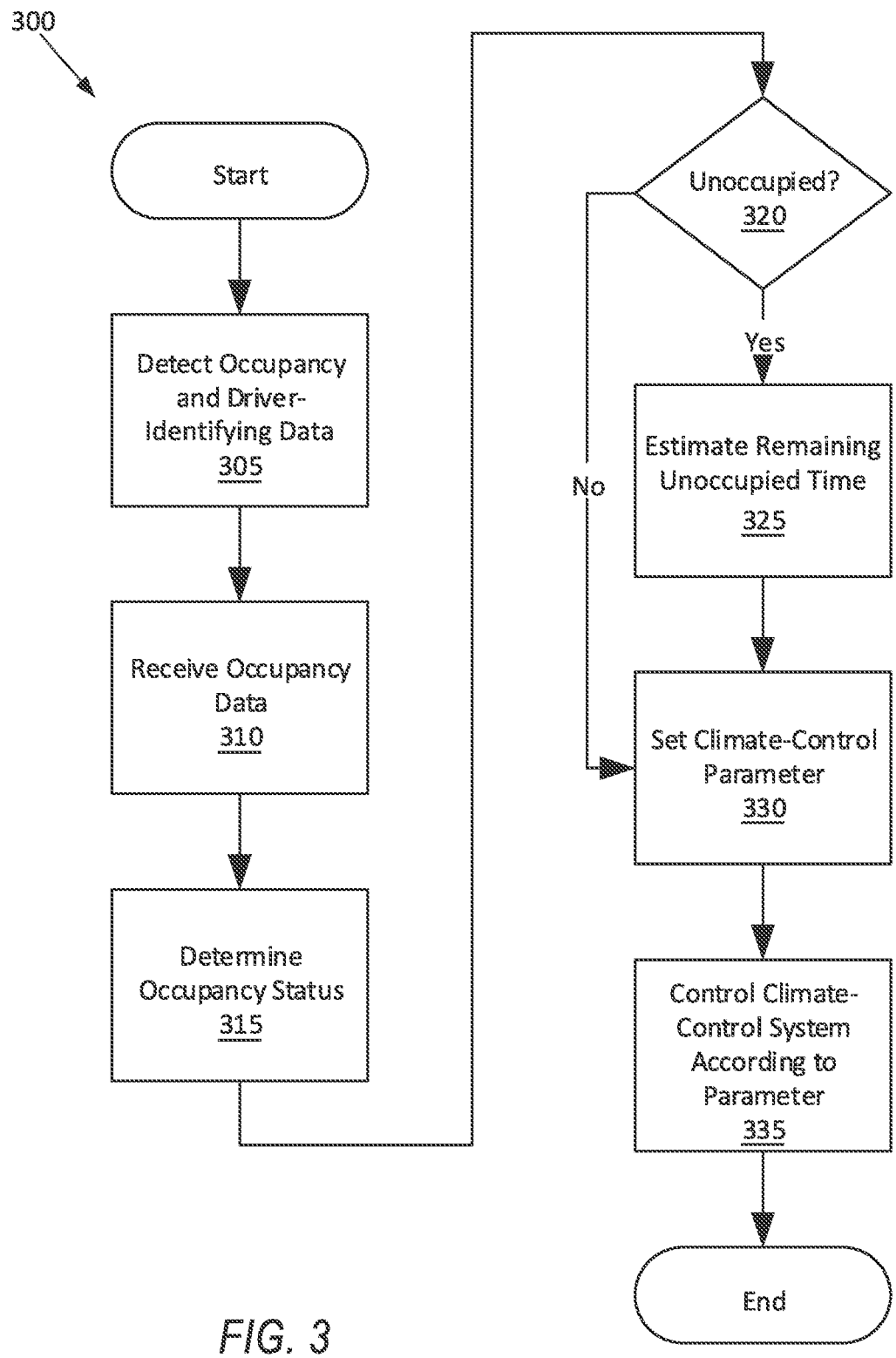
FIG. 3 is a process flow diagram of an exemplary process for controlling a climate-control system of the vehicle of FIG. 1.

FIG. 3 is a process flow diagram illustrating an exemplary process 300 for adjusting the efficiency characteristics of the vehicle 30 based on an occupancy status of the vehicle 30. The process begins in a block 305, in which the occupancy sensors 50 detect occupancy data and the driver-identification sensor 54 detects driver-identifying data. For example, if the sensors are weight sensors, the sensors may detect weight in the back seat 42 but not in the driver and passenger seats 38, 40.

Next, in a block 310, the controller 34 receives occupancy data from the occupancy sensors 50 and receives driver-identifying data from the driver-identification sensor 54 via the communications network 52.

Next, in a block 315, the controller 34 determines an occupancy status of the vehicle 30 based on received sensor data, including the occupancy data and the driver-identifying data. The controller 34 thus detects the occupancy status of the vehicle 30. The occupancy status may be determined to be one of multiple possible statuses stored in the memory of the controller 34. The memory may store as few as two possible occupancy statuses, up to a number of statuses to accommodate a unique occupancy status for each possible seating configuration, e.g., occupancy statuses for each possible occupancy state (occupied or unoccupied) for each seat in the vehicle 30. For example, if the vehicle 30 is an SUV or minivan with eight seats, there may be as many as $2^8=256$ occupancy statuses without using driver-identifying data.

For example, the occupancy status may be one of "occupied" and "unoccupied." The occupancy status is occupied if the occupancy data indicates that at least one of the seats 38, 40, 42 is occupied. The occupancy status is unoccupied if the occupancy data indicates that all the seats 38, 40, 42 are unoccupied.

For another example, the occupancy status may be one of "front-seat-occupied," "back-seat-only-occupied," and "unoccupied." The occupancy status is front-seat-occupied if the occupancy data indicate that at least one of the driver seat 38 and the passenger seat 40 is occupied. The occupancy status is back-seat-only-occupied if the occupancy data indicate that both the driver seat 38 and the passenger seat 40 are unoccupied and the back seat 42 is occupied. The occupancy status is unoccupied if the occupancy data indicate that the seats 38, 40, 42 are unoccupied.

For a third example, the occupancy status may be one of "driver-seat-only-occupied," "passenger-seat-only-occupied," "front-seat-only-occupied," "back-seat-only-occupied," "front-and-back-seat-occupied," and "unoccupied." The occupancy status is driver-seat-only-occupied if the occupancy data indicate that the driver seat 38 is occupied and the other seats 40, 42 are unoccupied. The occupancy status is passenger-seat-only-occupied if the occupancy data indicate that the passenger seat 40 is occupied and the other seats 38, 42 are unoccupied. The occupancy status is front-seat-only-occupied if the occupancy data indicate that the driver and passenger seats 38, 40 are occupied and the back seat 42 is unoccupied. The occupancy status is back-seat-only-occupied if the occupancy data indicate that the driver and passenger seats 38, 40 are unoccupied and the back seat 42 is occupied. The occupancy status is front-and-back-seat-occupied if the occupancy data indicate that at least one of the driver and passenger seats 38, 40 is occupied and the back seat 42 is occupied. The occupancy status is unoccupied if the occupancy data indicate that the seats 38, 40, 42 are unoccupied.

For a fourth example, the occupancy status may be one of "front-seat-occupied," "chauffeur," "back-seat-only-occupied," and "unoccupied." The occupancy status is front-seat-occupied if the occupancy data indicates that the driver seat 38 or the passenger seat 40 is occupied and the driver-identifying data indicates that an occupant of the driver seat 38 or passenger seat 40 is a nonchauffeur. A "chauffeur" is an individual preidentified by a vehicle owner as a driver who will be subject to different climate-control conditions. The occupancy status is chauffeur if the occupancy data indicates that the driver seat 38 is occupied, the passenger seat 40 is unoccupied, and the driver-identifying data indicates that an occupant of the driver seat 38 is a chauffeur. The occupancy status is back-seat-only-occupied if the occupancy data indicates that the driver and passenger seats 38, 40 are unoccupied and the back seat 42 is occupied. The occupancy status is unoccupied if the occupancy data indicates that the seats 38, 40, 42 are unoccupied. The chauffeur and back-seat-only-occupied statuses may be treated as the same occupancy status or as different statuses.

In addition to these three examples, other occupancy statuses and/or combinations of occupancy statuses are possible.

Next, in a decision block 320, the process 300 splits depending on whether the occupancy status is unoccupied or not. If the occupancy status is unoccupied, the process 300 proceeds to a block 325. If the occupancy status is not unoccupied, e.g., driver-seat-only-occupied, back-seat-only-occupied, and so on, then the process 300 proceeds to a block 330.

If the occupancy status is unoccupied, the controller 34 estimates a remaining unoccupied time. For example, if the vehicle 30 is traveling autonomously to a known destination, the vehicle 30 may be likely to pick up occupants at the destination. The controller 34 may use a planned route to estimate the remaining time to the destination, possibly incorporating traffic and road conditions, as is known in the art. The controller 34 may only estimate remaining time to particular destinations or to any destination as the remaining unoccupied time. For another example, the controller 34 may store a preset schedule with particular times designated when the vehicle 30 will become occupied. The controller 34 determines how much time remains to one of the designated times as the remaining unoccupied time. For a third example, the controller 34 may use a historical pattern of pickups or changes to the occupancy status to estimate the remaining unoccupied time. The controller 34 may track frequently recurring times or situations in which the occupancy status changed from the unoccupied status to one of the occupied statuses.

Next, after the decision block 320 if the vehicle 30 is occupied or after the block 325 if the occupancy status is unoccupied, in the block 330, the controller 34 sets a climate-control parameter for the climate-control system 32 based on at least the occupancy status and the remaining unoccupied time, if applicable. Setting the climate-control parameter is selecting the mode for the climate-control parameter, and thus determining how the climate-control system 32 will operate.

For example, if the occupancy status is unoccupied and the controller 34 determines that the remaining unoccupied time is below a predetermined threshold, the controller 34 sets the power status to on for at least one of the climate zones 44, 46, 48. If the climate-control system 32 runs on, for example, electrical power, the power status may be set to on even while the engine of the vehicle is off. Correspondingly, controlling the climate-control system 32 may include setting the power status to off if the occupancy status is unoccupied and the remaining unoccupied time exceeds the predetermined threshold.

For another example, the controller 34 may set the target temperature to a first target temperature if the occupancy status is occupied, and set the target temperature to a second target temperature if the occupancy status is unoccupied and the remaining unoccupied time exceeds a predetermined threshold. The second target temperature is closer to an environmental temperature than the first target temperature. In effect, the climate-control system 32, if the vehicle 30 is or will soon be occupied, expends more energy for climate control than it would otherwise expend in an unoccupied vehicle, and saves energy if the vehicle 30 is and will remain unoccupied.

For a third example, the controller 34 may set the power statuses to on for all climate zones 44, 46, 48 having at least one occupant and set the power statuses to off for all climate zones 44, 46, 48 lacking occupants.

For a fourth example, the controller 34 may set the power statuses according to whether the occupancy status is driver-seat-only-occupied, passenger-seat-only-occupied, front-seat-only-occupied, back-seat-only-occupied, front-and-back-seat-occupied, and unoccupied. The controller 34 sets a power status to on for the driver zone 44 and sets power statuses to off for remaining zones if the occupancy status is driver-seat-only-occupied. The controller 34 sets a power status to on for the passenger zone 46 and sets power statuses to off for remaining zones if the occupancy status is passenger-seat-only-occupied. The controller 34 sets power statuses to on for the driver and passenger zones 44, 46 and sets power statuses to off for remaining zones if the occupancy status is front-seat-only-occupied. The controller 34 sets power statuses to on for the rear zones 48 and sets power statuses to off for the driver and passenger zones 44, 46 if the occupancy status is back-seat-only-occupied. The controller 34 sets power statuses to on for all zones if the occupancy status is front-and-back-seat-occupied.

For a fifth example, the controller 34 may set the target temperatures to a first target temperature for all climate zones 44, 46, 48 having at least one occupant and set the target temperatures to a second target temperature for all climate zones 44, 46, 48 lacking occupants. The second target temperature may be closer to an environmental temperature, that is, the temperature of the atmosphere outside the vehicle 30, than the first target temperature. For example, when the environmental temperature is 85°, the first target temperature may be 70°, and the second target temperature may be 78°.

For a sixth example, the controller 34 may set the power levels to a first power level for all climate zones 44, 46, 48 having at least one occupant and set the power levels to a second power level for all climate zones 44, 46, 48 lacking occupants. The first power level may be higher than the second power level.

Next, in a block 335, the controller 34 controls the climate-control system 32 according to the climate-control parameter based on at least the occupancy status and the remaining unoccupied time, if applicable, as described above, for example, the power status(es) and/or target temperature(s) for the passenger cabin 36 or climate zones 44, 46, 48. For example, if the power status for a climate zone 44, 46, 48 is set to on, the climate-control system 32 provides heating or cooling to that climate zone 44, 46, 48, and if the power status for that climate zone 44, 46, 48 is set off, the climate-control system 32 does not provide heating or cooling to that climate zone 44, 46, 48. For another example, for a target temperature for a climate zone 44, 46, 48, the climate-control system 32 provides heating or cooling to that climate zone 44, 46, 48 so as to bring that climate zone 44, 46, 48 to the target temperature. The process 300 ends following the block 335.

The process 300 may be carried out according to program instructions stored in the memory, and executed in the processor, of the controller 34. For example, to execute the exemplary process 300, the controller 34 is programmed to determine that the occupancy status of the vehicle 30 is unoccupied, estimate the remaining unoccupied time, and control the climate-control system 32 according to the climate-control parameters based on at least the occupancy status and the remaining unoccupied time. The controller 34 may be further programmed to set the power status to off if the occupancy status is unoccupied and the remaining unoccupied time exceeds the predetermined threshold. Alternatively or additionally, the controller 34 may be further programmed to set the target temperature to the first target temperature if the occupancy status is occupied, and set the target temperature to the second target temperature if the occupancy status is unoccupied and the remaining unoccupied time exceeds the predetermined threshold, wherein the second target temperature is closer to an environmental temperature than the first target temperature. Yet further alternatively or additionally, the controller 34 may be further programmed to set power statuses to on for all climate zones 44, 46, 48 having at least one occupant and setting power statuses to off for all climate zones 44, 46, 48 lacking occupants. Yet further alternatively or additionally, the controller 34 may be further programmed to determine that the occupancy status has changed from the unoccupied status to one of the driver-seat-only-occupied status, the passenger-seat-only-occupied status, the front-seat-only-occupied status, the back-seat-only-occupied status, and the front-and-back-seat-occupied status.

Computing devices such as the controller 34 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 300, one or more of the steps could be omitted, or the steps could be executed in a different order than shown in FIG. 3. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A method of controlling a vehicle comprising:
    determining that an occupancy status of the vehicle is unoccupied using data received from occupancy sensors;
    estimating a remaining unoccupied time as a remaining time to a destination to which the vehicle is currently autonomously traveling;
    setting a target temperature to a first target temperature if the occupancy status is occupied; and
    setting the target temperature to a second target temperature if the occupancy status is unoccupied and the remaining unoccupied time exceeds a predetermined threshold;
    wherein the second target temperature is closer to an environmental temperature than the first target temperature.

2. The method of claim 1, further comprising controlling a climate-control system according to climate-control parameters based on at least the occupancy status and the remaining unoccupied time, wherein controlling the climate-control system includes setting a power status to off if the occupancy status is unoccupied and the remaining unoccupied time exceeds a predetermined threshold.

3. The method of claim 1, further comprising controlling a climate-control system according to climate-control parameters based on at least the occupancy status and the remaining unoccupied time, wherein controlling the climate-control system includes setting a power status to on if the occupancy status is unoccupied and the remaining unoccupied time is below a predetermined threshold, while an engine of the vehicle is off.

4. The method of claim 1, further comprising controlling a climate-control system according to climate-control parameters based on at least the occupancy status and the remaining unoccupied time, wherein the climate-control parameters include power statuses each corresponding to a climate zone.

5. The method of claim 4, further comprising setting power statuses to on for all climate zones having at least one occupant and setting power statuses to off for all climate zones lacking occupants.

6. The method of claim 1, further comprising controlling a climate-control system according to climate-control parameters based on at least the occupancy status and the remaining unoccupied time, wherein the climate-control parameters include target temperatures each corresponding to a climate zone.

7. The method of claim 6, further comprising setting target temperatures to a third target temperature for all climate zones having at least one occupant and setting target temperatures to a fourth target temperature for all climate zones lacking occupants, wherein the fourth target temperature is closer to an environmental temperature than the third target temperature.

8. The method of claim 1, further comprising controlling a climate-control system according to climate-control parameters based on at least the occupancy status and the remaining unoccupied time, wherein the climate-control parameters include power levels each corresponding to a climate zone.

9. The method of claim 1, further comprising setting power levels to a first power level for all climate zones having at least one occupant and set power levels to a second power level for all climate zones lacking occupants, wherein the first power level is higher than the second power level.

10. The method of claim 1, further comprising classifying an occupant of the vehicle as either a chauffeur or nonchauffeur using data received from a driver-identification sensor, and controlling the climate-control system according to climate-control parameters based on at least the occupancy status, the remaining unoccupied time, and the classification of the occupant as a chauffeur or nonchauffeur.

11. A controller comprising a processor and a memory for a vehicle including a climate-control system, the controller programmed to:
    determine that an occupancy status of the vehicle is unoccupied using data received from occupancy sensors;
    estimate a remaining unoccupied time as a remaining time to a destination to which the vehicle is currently autonomously traveling;
    set a target temperature to a first target temperature if the occupancy status is occupied; and
    set the target temperature to a second target temperature if the occupancy status is unoccupied and the remaining unoccupied time exceeds a predetermined threshold;
    wherein the second target temperature is closer to an environmental temperature than the first target temperature.

12. The controller of claim 11, wherein the controller is further programmed to control a climate-control system according to climate-control parameters based on at least the occupancy status and the remaining unoccupied time, and programming to control the climate-control system includes programming to set a power status to off if the occupancy status is unoccupied and the remaining unoccupied time exceeds a predetermined threshold.

13. The controller of claim 11, wherein the controller is further programmed to control a climate-control system according to climate-control parameters based on at least the occupancy status and the remaining unoccupied time, and programming to control the climate-control system includes programming to set a power status to on if the occupancy status is unoccupied and the remaining unoccupied time is below a predetermined threshold, while an engine of the vehicle is off.

14. The controller of claim 11, wherein the controller is further programmed to control a climate-control system according to climate-control parameters based on at least the occupancy status and the remaining unoccupied time, and the climate-control parameters include target temperatures each corresponding to a climate zone.

15. The controller of claim 14, wherein the controller is further programmed to set target temperatures to a third target temperature for all climate zones having at least one occupant and set target temperatures to a fourth target temperature for all climate zones lacking occupants, wherein the fourth target temperature is closer to an environmental temperature than the third target temperature.

16. The controller of claim 11, wherein the controller is further programmed to control a climate-control system according to climate-control parameters based on at least the occupancy status and the remaining unoccupied time, and the climate-control parameters include power levels each corresponding to a climate zone.

17. The controller of claim 16, wherein the controller is further programmed to set power levels to a first power level for all climate zones having at least one occupant and set power levels to a second power level for all climate zones lacking occupants, wherein the first power level is higher than the second power level.

18. The controller of claim 11, wherein the controller is further programmed to control a climate-control system according to climate-control parameters based on at least the occupancy status and the remaining unoccupied time, and the climate-control parameters include power statuses each corresponding to a climate zone.

19. The controller of claim 18, wherein the controller is further programmed to set power statuses to on for all climate zones having at least one occupant and setting power statuses to off for all climate zones lacking occupants.

20. The controller of claim 11, wherein the controller is further programmed to classify an occupant of the vehicle as either a chauffeur or nonchauffeur using data received from a driver-identification sensor, and control the climate-control system according to climate-control parameters based on at least the occupancy status, the remaining unoccupied time, and the classification of the occupant as a chauffeur or nonchauffeur.

* * * * *